March 15, 1949.  F. M. LANDRUM  2,464,695
LAWN EDGER
Filed June 4, 1945  2 Sheets-Sheet 1
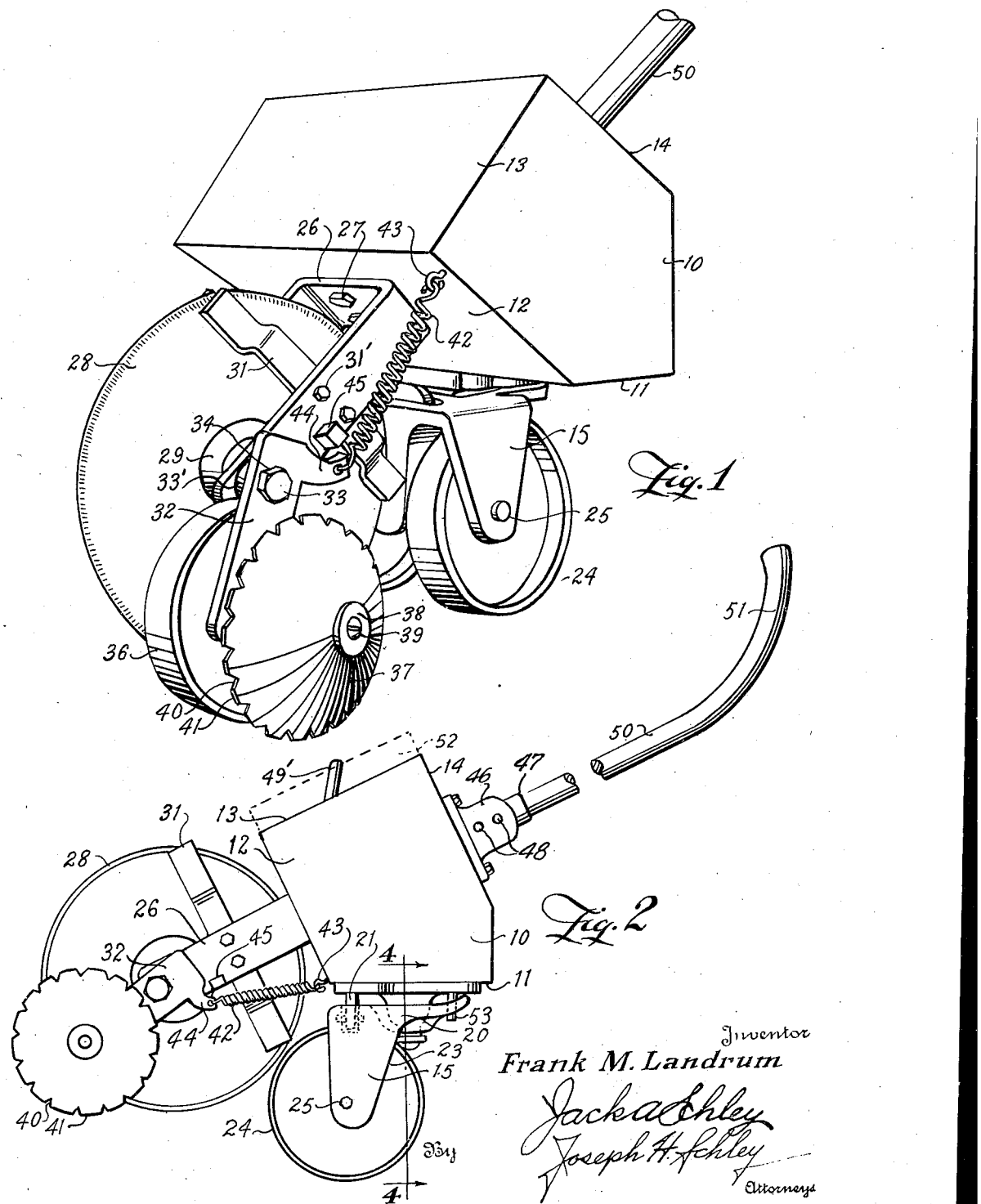
Inventor
Frank M. Landrum
Jack A. Schley
Joseph H. Schley
Attorneys March 15, 1949.  F. M. LANDRUM  2,464,695
LAWN EDGER
Filed June 4, 1945  2 Sheets-Sheet 2

Inventor
Frank M. Landrum
By Jack Ashley
Joseph H. Ashley
Attorneys

Patented Mar. 15, 1949

2,464,695

UNITED STATES PATENT OFFICE 2,464,695

LAWN EDGER

Frank M. Landrum, Dallas, Tex.

Application June 4, 1945, Serial No. 597,522

9 Claims. (Cl. 30—319)

This invention relates to new and useful improvements in lawn edgers.

One object of the invention is to provide an improved edger for trimming or cutting grass along the edge of a lawn contiguous to a side wall, flower bed, wall, curbing or other boundary and having a weight for forcing the cutter downwardly together with supporting or gauging means to limit the downwardly adjustment of the cutter, whereby the cutting or trimming will be expiditiously and efficiently performed with a minimum expenditure of labor.

A further object of the invention is to provide an improved edger having spring sustained rotatable and yieldably mounted cutter supports adapted to roll on the inclined or irregular edge of a grass lawn to aid in maintaining the depth of cut and for holding the cutter against the curbing or walk, whereby trimming may be done in a straight, curved or undulating line.

Another object of the invention is to provide a roller support or carriage on which the edger elements are universally mounted, whereby the cutter may be freely moved into various angular positions without disturbing the angular position of the carriage, when the edger is in use and is being pushed along the edge of a lawn, in order to maintain the cut in the desired line and direction.

Still another object of the invention is to provide an improved edger which is universally mounted on a rolling carriage together with an operating handle having a curved hand grip, whereby the edger may be more readily adjusted to various angles while being used.

A further object of the invention is to provide an edger having a carriage equipped with a pair of spaced rollers arranged so that one roller will track upon the surface of the edge portion of a well or curbing, while the other roller tracks in the depression contiguous to the edge of the walk or curbing, or against the vertical edge thereof, whereby the edger is guided and held in the desired path.

Still another object of the invention is to provide an improved edger having a flexible presser roller for pressing down the grass on the inclined or irregular surface of the lawn contiguous to the cut, whereby the grass is brought into position to be cut without scoring or marring the lawn.

A construction designed to carry out the invention will be hereinafter described together with other features of the invention.

The invention will be more readily understood from a reading of the following specification and by reference to the accompanying drawings, wherein an example of the invention is shown, and wherein:

Fig. 1 is a perspective view of an edger constructed in accordance with the invention, Fig. 2 is a side elevation of the same.

Figures 3, 4:
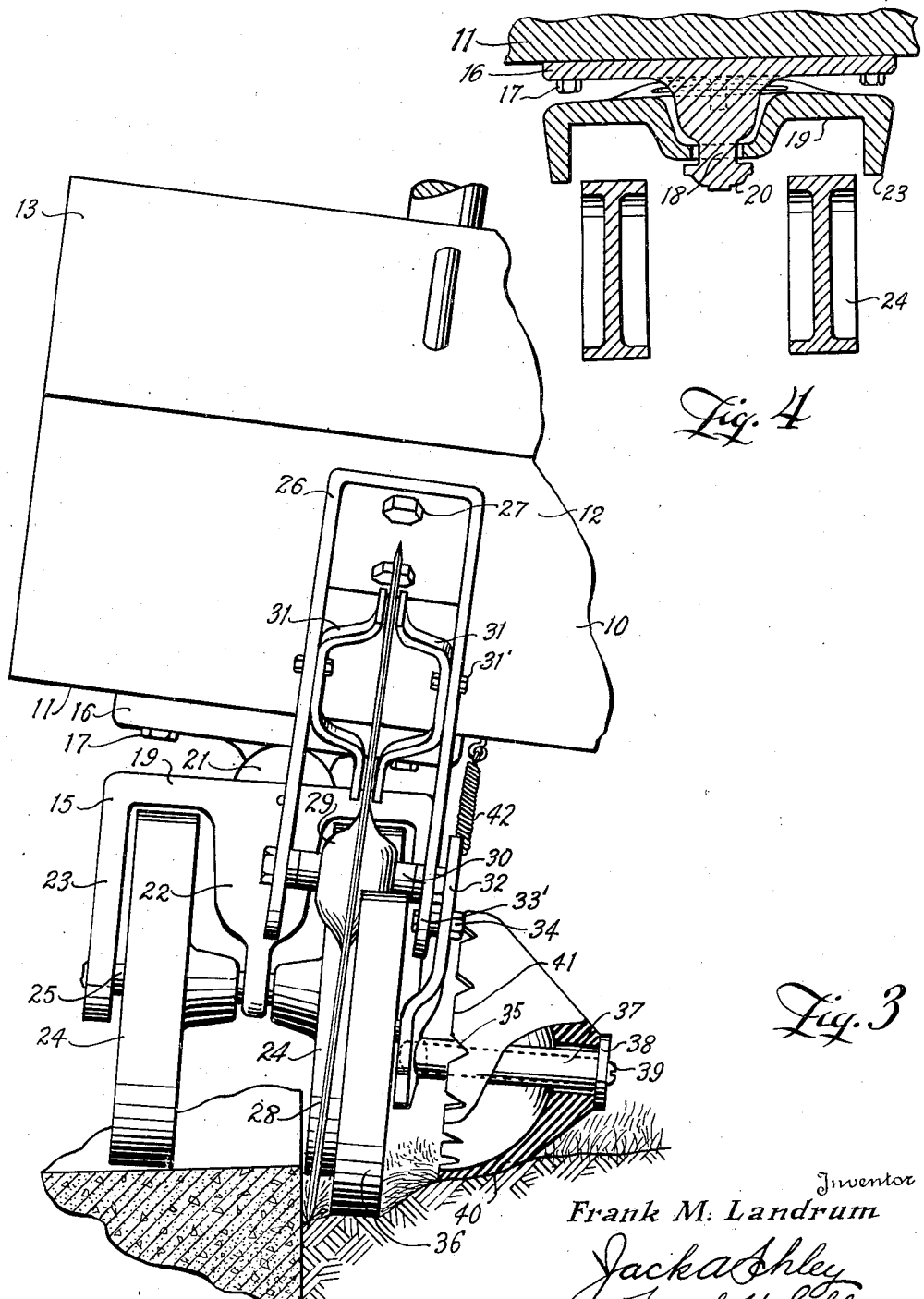
Fig. 3 is a front elevation of the edger in cutting position.
Fig. 4 is a transverse sectional view taken on the line 4—4 of Fig. 2.

In the drawings, the numeral 10 designates a heavy body or weight which may also be referred to as a support. This body is preferably made of a block of metal which may be formed in any suitable manner as by casting; however, the invention is not to be limited to the use of metal because the body could be made of any suitable material. For the purpose of the invention, the body should weigh several pounds as for instance from twenty to thirty pounds according to the size of the edger and the uses to which it is to be put.

The body 10 is preferably provided with a flat bottom 11, a lower front side or face 12, an inclined upper front side 13 and an inclined rear side 14, but the particular shape is unessential and any usable and desirable configuration may be employed. The body is supported on a rolling carriage indicated generally by the numeral 15. This carriage includes a base plate 16 which is preferably secured to the medial portion of the flat bottom 11 by machine bolts 17 or other suitable fastenings. As is best shown in Fig. 4, the base plate is provided with a depending stud 18 on which a bracket 19 is loosely confined by a head 20. A roller 21 is suitably journaled in the front of the bracket so as to bear against the underside of the plate 16. A center arm 22 depends from the bracket in front of the roller and side plates 23 depend from opposite sides of the bracket on each side of the center arm. Rollers 24 are journaled on an axle 25 passing through the plates and the arm, whereby the rollers are journaled on each side of the arm and between the plates. By reason of the pivoting of the bracket 19 on the axle 25 and the looseness of the stud 18 in said bracket, substantially a universal mounting of the body 10 is provided when the rollers 24 are resting on the ground and pavement. It is obvious that the mounting on the axle permits swinging of the body in a vertical arc transverse to said axle, while the loose connection at 18 permits the body to be swung laterally in all directions; the roller 21 limiting the swing in one direction.

At the medial portion of the front face 12, a yoke 26 is secured to the body by stud bolts 27 so that the arms of the yoke are directed forwardly and downwardly; however, the yoke is offset laterally of the carriage 15. A circular cutter disk 28 is provided with a hub 29 which is rotatably mounted on a shaft 30 secured in the forward end of the yoke. This cutter has the usual cutting edge. A pair of inwardly offset scraping blades 31 are secured to the inner faces of the arms of the yoke by bolts 31' and engage the opposite sides of the cutter for scraping dirt and foreign matter therefrom. These blades are preferably made of spring metal so as to maintain the necessary frictional contact with the cutter disk. A hanger 32 is pivoted at its upper end on a stud 33 carried by one arm of the yoke; being spaced from the yoke by a washer 33' and confined by a nut 34. A stub shaft 35 extends through the lower end of the hanger which latter is twisted so as to position a depth or gage roller 36 to mash down the grass for the cutter. The roller 36 is journaled on the shaft between the hanger and the cutter disk. A hub 37 is journaled on the shaft 35 outwardly of the hanger, being confined by a washer 38 secured to the end of the shaft by a screw bolt 39. A frusto-conical roller 40 is suitably attached to the hub as by vulcanizing and is made with a relatively thin annular wall as is best shown in Fig. 3, so as to give the desired flexibility to the roller. The circular edge of the roller is provided with flat teeth 41 so as to give it traction upon the grass. This roller may be made of rubber or any other suitable pliable or elastic material.

For resiliently sustaining the hanger 32 and its rollers 36 and 40, a coiled spring 42, having its upper end attached to an eye 43 on the face 12 of the body 10, has its lower and forward end connected to an arm 44 extending rearwardly from the upper end of the hanger above the pivot 33. The spring, being under tension, acts to swing the arm 44 upwardly, whereby the lower end of the hanger and the rollers carried thereby, are swung downwardly; thus, when the rollers 36 and 40 are brought into engagement with the lawn and the cutter disk 28 forced downwardly, the rollers are arrested so that the hanger is swung and the spring 42 further tensioned. This arrangement provides the spring pressure necessary to yieldably hold said rollers in contact with the grass and press it down. For limiting the downward swing of the hanger, a stop lug 45 is provided on the side of the yoke 26 in the path of the upward swing of the arm 44.

It will be observed that the carriage rollers 24 are spaced apart transversely of the body 10. When the edger is in use, as indicated in Fig. 3, the left hand roller will be resting upon the top or surface of the walk or curbing; while the right hand roller will be rolling on the grass and against the edge of the walk or curbing. This will throw the bracket 22 at an angle to the perpendicular; however, owing to the universal mounting provided by the stud 18, the base plate 16 and the body may assume a horizontal or any other reasonable position. This arrangement permits manipulation of the body 10 to not only raise and lower the cutter disk 28, but to tilt it from a vertical plane to bring it to the desired cutting position.

The handle for pushing the edger becomes an important feature of this particular invention, as will be hereinafter pointed out. On the medial portion of the upper rear side 14 of the body, a pair of spaced ears 46 are preferably cast. A ferrule 47 is secured between the ears by a pair of transverse bolts 48. A handle 50 made of wood or other suitable material has its lower end fastened in the ferrule. At its upper end the handle is curved upwardly to form a hand grip 51. When in use, the operator grasps the grip with his left hand; holding the handle below the grip with his right hand. This enables him to push the edger forwardly while walking sidewise as is customary with this class of tools, but at the same time may readily swing the handle to either side as well as up and down.

The sidewise and up and down movement of the handle is made possible by reason of the curved hand grip 51 and the universal mounting of the body 10 on the carriage 15. It may be desirable, under some cutting conditions, to add weight to the body 10 and this may be done in different ways. The top 13 of the weight is provided with an upstanding pin 49' and a weight member 52 (dotted lines) may be placed thereon. The invention is not to be limited to the curved hand grip 51, since an ordinary lawn-mower handle or any other handle could be used. In order to limit the relative rotations of the body 10 and the brackets 22, the base plate has a depending stud 53 projecting through an arcuate slot 54 in the rear of the bracket.

The operation of the edger, it is believed, will be clear from the description hereinbefore given. By observing Fig. 2, it will be seen that the major portion of the body 10 overhangs the carriage 15 forwardly of the axle 25 thereof and thus, the major portion of the weight of said body is thus imposed upon the cutter disk 28, whereby the latter will be forced downwardly; while the depth roller 36 and pressure roller 40 yield upwardly. In this manner the cutter will trim the grass, pentrate the soil sufficiently to cut the grass roots and scrape both from the edge of the walk or curbing. The body 10 may be given sufficient weight to force the cutter into trimming position without manual assistance so that the operator merely has to push and guide the edger; however, the operator may press downwardly with his right hand, if additional force is necessary in penetrating hard ground.

When the edger is in use where there is no ditch or dug-out trench contiguous to the curbing, the cutter disk 28 will cut the soil away from the edge of the curbing or wall. It will be noted by observing Fig. 3 that the yoke 26 is offset laterally from the carriage 15 and this causes the inner roller 24 to track behind the cutter. Due to the weight of the body 10 the soil loosened by the cutter will be mashed down by the inner roller 24, as well as the grass, whereby a groove will be formed in the lawn contiguous to the curbing. The roller 36 may be positioned quite close to the cutter and the roller 40 close to the roller 36. In Fig. 3, the parts are shown spaced to more clearly illustrate them, but they can be closer together. The roller 36 mashes down the grass for the cutter and the presser roller 40 co-acts therewith. The cutter has a tendency in coaction with the rollers 36 and 40 to stretch or smooth out the grass so that when the grass is finally released by the inner roller 24, it will spring up and stand substantially flush with the top surface of the curbing or walk.

Actual use of the edger has demonstrated many advantages. The edger is under control of the operator at all times. By engaging the spaced rollers 24 on the upper angular edge of the curbing or walk, an excellent guide as well as a steady support is obtained. The angle of the cutter may be readily and easily changed by swinging the body transversely without disturbing the tracking of the carriage. The scrapers 31 keep the cutter clean which is highly desirable and necessary if the ground is damp. The presser roller 40 presses the grass down without tracking the lawn and co-acts with the depth roller which holds the grass down and limits the depth of the penetration of the cutter, in accordance with the tension of the spring 42. Obviously, the manual labor is reduced and the trimming efficiency is increased. Curved and irregular walks and curbing may be easily followed.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A lawn edger including, a carriage having a pair of supporting wheels on which it is pivoted, a weighted body pivotally mounted to rock laterally on the carriage, a support extending forwardly from the body, a disk cutter carried by the support in advance of the carriage, and a handle attached to the body for propelling the body and carriage and for swinging said body arcuately of said carriage both laterally and vertically.

2. A lawn edger as set forth in claim 1, a grass gage roller yieldably carried by the support at one side of the cutter disk.

3. A lawn edger as set forth in claim 1, a grass gage roller yieldably carried by the support at one side of the cutter disk, and a flexible grass pressure roller carried by the support on the outer side of the gage roller with respect to the cutter disk.

4. A lawn edger as set forth in claim 1, wherein the handle is inclined upwardly and has an upstanding hand grip at its upper end for aiding in swinging the body and the cutter in a vertical direction.

5. A lawn edger including, a body, a support extending forwardly from the body, a cutter disk journaled on the support, a handle extending rearwardly from the body, and a carriage including a pair of spaced supporting rollers on which it is pivoted and a pivotal connection on which the body is mounted, whereby said body may be swung transversely to the rollers to permit the cutter disk to be adjusted at various angles to the perpendicular.

6. A lawn edger as set forth in claim 5, a grass gage roller yieldably carried by the support at one side of the cutter disk.

7. A lawn edger as set forth in claim 5, a grass gage roller yieldably carried by the support at one side of the cutter disk, and flexible grass pressure roller carried by the support on the outer side of the gage roller with respect to the cutter disk.

8. A lawn edger including, a body, a carriage on which the body is secured, the carriage including a lower member mounted on a pair of spaced wheels having their journals transverse of said member and an upper member pivoted to the lower member so as to rock laterally, a support extending from the body, an upright cutter disk carried by the support in advance of the carriage rollers, and a handle extending from the body.

9. An edger as set forth in claim 8, and a gage roller yieldably mounted on the support at one side of the cutter disk.

FRANK M. LANDRUM.

REFERENCES CITED

The following references are of record in the file of this patent:

UNITED STATES PATENTS

| Number | Name | Date |
| --- | --- | --- |
| 717,030 | Sager | Dec. 30, 1902 |
| 1,181,281 | Albert | May 2, 1916 |
| 1,402,579 | Desilets | Jan. 3, 1922 |
| 1,861,104 | Wolf | May 31, 1932 |